(12) United States Patent
Jacobsen et al.

(10) Patent No.: US 7,184,467 B2
(45) Date of Patent: Feb. 27, 2007

(54) METHOD TO MITIGATE EFFECTS OF ISDN OFF/ON TRANSITIONS IN ADSL

(75) Inventors: Krista S. Jacobsen, San Jose, CA (US); Michael D. Agah, Monte Sereno, CA (US); Brian R. Wiese, San Francisco, CA (US)

(73) Assignee: Texas Instruments Incorporated, Dallas, TX (US)

( * ) Notice: Subject to any disclaimer, the term of this patent is extended or adjusted under 35 U.S.C. 154(b) by 880 days.

(21) Appl. No.: 10/294,402

(22) Filed: Nov. 14, 2002

(65) Prior Publication Data

US 2003/0123560 A1 Jul. 3, 2003

Related U.S. Application Data

(60) Provisional application No. 60/344,132, filed on Dec. 27, 2001.

(51) Int. Cl.
*H04B 1/38* (2006.01)

(52) U.S. Cl. ....................................................... 375/222

(58) Field of Classification Search ................ 375/260, 375/219, 220, 222, 223, 224, 225, 227; 370/201, 370/286, 289, 292, 433, 464; 455/570; 379/3, 379/406.01, 406.05
See application file for complete search history.

(56) References Cited

U.S. PATENT DOCUMENTS 6,061,427 A   5/2000   Ryoo 6,205,410 B1   3/2001   Cai
6,510,184 B1 *  1/2003   Okamura ..................... 375/260
2003/0076878 A1 *  4/2003   Jones et al. ................. 375/219

FOREIGN PATENT DOCUMENTS

EP     0 918 422 A2     5/1999

OTHER PUBLICATIONS

Gaikwad et al. "Joint Signaling Techniques for Crosstalk-Dominated Communication Channels", Global Telecommunications Conference, Globecom 1999, p. 1145-1148.*

* cited by examiner

*Primary Examiner*—Khanh Tran
*Assistant Examiner*—Sam K. Ahn
(74) *Attorney, Agent, or Firm*—Steven A. Shaw; W. James Brady; Frederick J. Telecky, Jr.

(57) ABSTRACT

The present invention provides for a method and apparatus for allocating data to subchannels used for ADSL transmission over a communication link which supports further system transmissions. An expected interference impact from the further system transmissions is estimated for the ADSL subchannels. Signal-to-noise ratios (SNRs) for the subchannels are determined for bit loading by an estimator (220). In one embodiment, actual noise associated with the communication link is used at initialization to determine a SNR which is subsequently modified by an adjusting unit (205) prior to bit loading responsive to the estimated interference impact. In another embodiment, a virtual noise signal, indicative of the estimated interference impact and generated by a noise signal generator (235), is summed with the actual noise prior to determining a SNR for bit loading. Prior to transmitting, the data is allocated to the subchannels by a bit loader (210) based on respective SNRs modified responsive the estimated interference impact.

30 Claims, 3 Drawing Sheets

METHOD TO MITIGATE EFFECTS OF ISDN OFF/ON TRANSITIONS IN ADSL

This application claims the priority under 35 U.S.C. 119(e)(1) of now abandoned, U.S. provisional application No. 60/344,132, filed on Dec. 27, 2001 and incorporated herein by reference.

BACKGROUND OF THE INVENTION

1. Technical Field of the Invention

The present invention relates generally to the field of communications and, more particularly, to an approach for mitigating interference into a digital subscriber line system.

2. Description of Related Art

Current telephone wiring connections comprised of copper twisted-pair were not designed to support the data rates or bandwidth required for new interactive services. However, since copper lines are widely available and developed, solutions to the high speed access problem have been focused on improving the performance of systems which operate over voice-band and transmit through the public switching telephone network (PSTN). Voice-band modems are now common, but the bit rates that can be supported by voice-band modems are limited to 56 kilobits per second (kbps) or less.

The Integrated Service Digital Network (ISDN) offers an alternative to analog telephone service. In contrast to analog telephone signals (known as plain old telephone service or POTS signals), which occupy the bandwidth only up to about 4 kHz, ISDN signals can occupy frequencies up to approximately 320 kHz. ISDN supports not only voice transmission, but also data channels with bit rates on the order of 160 kbps, which is an improvement over voice-band modems. Three types of ISDN are generally used. In 2B1Q ISDN, used in North America and elsewhere, signals reside in the primary band from 0 to 80 kHz. In 4B3T ISDN, common in Germany, signals reside in the primary band from 0 to 120 kHz. In time-compression multiplexed (TCM) ISDN, common in Japan, signals occupy the primary band from 0 to 320 kHz. Due to the techniques used to modulate data, all these ISDN systems generate energy at frequencies above their primary bands.

Asymmetric Digital Subscriber Line (ADSL) technology has been developed to increase the effective bandwidth of existing copper twisted-pair communication links, enabling expanded services to be provided without requiring the additional cost of replacing or updating telephone wiring connections, whether POTS or ISDN. Several varieties of ADSL exist. In one commonly used system, ADSL and POTS service are provided simultaneously on the same twisted-pair line; in this case the ADSL is referred to as "ADSL over POTS". In another commonly used system, ADSL and ISDN are provided simultaneously on the same twisted-pair line; in this case, the ADSL is referred to as "ADSL over ISDN". Both ADSL over POTS and ADSL over ISDN operate similarly. During the initialization procedure, the ADSL system estimates the loop attenuation and channel noise. Based on these estimates and knowledge of the transmitter capabilities, the system computes the number of bits each subchannel (tone) can support at a desired bit error rate. Typically a noise margin is assumed in the calculation, resulting in a reduction in the number of bits that are supported on each tone (and thus the data rate of the system). The purpose of the noise margin is to allow the system to continue operating at or below the desired bit error rate if the channel capacity degrades during the connection up to the amount specified by the noise margin. Most systems assume a noise margin of 6 dB, which is generally effective to provide good system operation under the assumption that the noise on the line does not increase significantly during the connection.

Bit swapping may be used after a connection has been established to maintain good performance by equalizing the bit error probabilities of the tones. If the signal-to-noise ratio (SNR) of a tone degrades, one or more bits on that tone are moved to other, higher-quality tones. Bit swapping is generally effective at mitigating the effects of slow changes in the channel and noise.

Although the use of a noise margin and bit swapping are effective strategies to maintain good system performance when the channel is degraded by impairments that are, to an extent, expected in the normal course of operation, there are certain non-constant noise sources that degrade the channel rapidly enough or severely enough that the connection is abandoned, and a re-train occurs. Two examples of severe, non-constant noise sources are residual same-pair ISDN and near-end crosstalk (NEXT) from TCM ISDN.

Interference from Same-Pair ISDN

To provide ADSL on the same line as either POTS or ISDN, systems must be designed such that the frequency bands used by the two systems sharing the line do not overlap. The separation of the two signals (ADSL and either POTS or ISDN) is achieved using a splitter. The splitter has two components: a highpass filter, which passes ADSL signals but attenuates the lower-frequency signal (for example, POTS or ISDN); and a lowpass filter, which passes the lower-frequency signal and attenuates ADSL signals. Ideally, the splitter isolates ADSL from the lower-frequency signal to such an extent that interference from ADSL to the lower-frequency system and vice versa is negligible.

In practice, splitter filters are subject to common design trade-offs, such as cost vs. complexity, performance vs. cost, etc. Consequently, splitter filters may not exhibit the ideal behavior, and the level of residual ISDN at the ADSL receiver may not be negligible. Thus, ADSL can be degraded by ISDN signals that are insufficiently attenuated by the splitter lowpass filter.

Currently, most ADSL over ISDN systems transmit upstream in the band from 138 kHz to some frequency less than or equal to 276 kHz. This band corresponds to tones 32 through 63, using the standard method of indexing the ADSL tones. However, the upstream ADSL over ISDN power spectral density (PSD) masks allow transmissions as low as 120 kHz. Ideally, after the splitter, the levels of ISDN signals entering the ADSL receiver on the same line should be low enough that they do not impact the performance of the ADSL system. However, for tones around tone 32, signal corruption from interference from same-pair ISDN signals can occur due to the non-ideal nature of the splitter. If ISDN is not on when an ADSL modem initializes, the impact on ADSL when ISDN does turn on can result in a failure of the ADSL, which is forced to retrain due to an excess of bit errors and/or a negative noise margin.

Interference due to NEXT from TCM ISDN

Another commonly used ISDN system, as used in Japan, is the Time-Compression Multiplexing (TCM) ISDN system in which downstream and upstream transmissions are time-division duplexed. A primary channel bandwidth of 320 kHz is used in both the upstream and downstream directions but during different, deterministic time intervals. DSL systems, such as ADSL over POTS and ADSL over ISDN, can be deployed in the same binder as TCM ISDN but on other lines. In this case, the DSL systems operate independently of the TCM ISDN systems, and the frequency bands used by TCM ISDN and ADSL may overlap. In this configuration, if an ADSL system initializes while a potential disturbing ISDN line is inactive, and then the ISDN line becomes active after the ADSL connection has been established, the ADSL system can fail due to the high-level near-end crosstalk (NEXT) caused by TCM ISDN. As a result, the ADSL system will re-train. Such system instability is highly undesirable.

SUMMARY OF THE INVENTION

The present invention achieves technical advantages as a method and apparatus for allocating data to subchannels used for ADSL transmission over a communication link which supports further system transmissions. An expected interference impact from the further system transmissions is estimated for the subchannels. Signal-to-noise ratios (SNRs) for the subchannels are determined for bit loading. In one embodiment, actual noise associated with the communication link is used at initialization to determine a measured SNR which is subsequently modified prior to bit loading responsive to the estimated interference impact. In another embodiment, a virtual noise signal (indicative of the estimated interference impact) is combined with the actual noise prior to determining a SNR for bit loading. Prior to transmitting, the data is allocated to the subchannels based on respective SNRs modified responsive to the estimated interference impact.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1A:
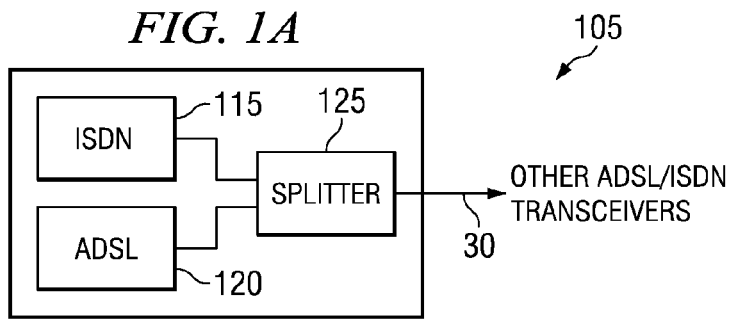
FIG. 1A is a block diagram illustrating a system for mitigating integrated services digital network interference in accordance with an exemplary embodiment of the present invention.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Referring now to FIG. 1A there is shown a block diagram illustrating an ADSL over ISDN system 105 in which the present invention for mitigating integrated services digital network interference can be used. The system 105 includes an ISDN transceiver 115 and a ADSL transceiver 120 coupled to a splitter 125 cooperable therewith for simultaneous transmission and reception of ADSL and ISDN signals to one or more other ADSL/ISDN transceivers via the communication link 30. Though the present invention is described in conjunction with the communication link 30 comprising one or more copper twisted-pairs, it should be noted that it can be used in conjunction with any number of other channel environments having different operating properties and impairments.

In this exemplary system, to enable simultaneous provision of ADSL and ISDN, the bandwidth of ADSL is constrained to frequencies above the primary band used by ISDN. The primary band for 2B1Q ISDN is from 0 to 80 kHz, the primary band for 4B3T ISDN is from 0 to 120 kHz, and the primary band for TCM ISDN is from 0 to 320 kHz. However, these systems typically generate energy at frequencies beyond that of the primary band, which can cause interference. Ideally, the splitter 125 prevents ISDN signals from impacting the performance of ADSL operating on the same twisted-pair. However, conventional splitters are subject to common design trade-offs (such as cost vs. complexity, performance vs. cost, etc.) and, thus, may not exhibit the desired behavior. Thus, ADSL tones near the lower band edge can be corrupted by interference from residual same-pair ISDN signals. In accordance with the present invention, the negative impact of leakage into the ADSL band from same-pair ISDN signals is advantageously mitigated.

Figure 1B:
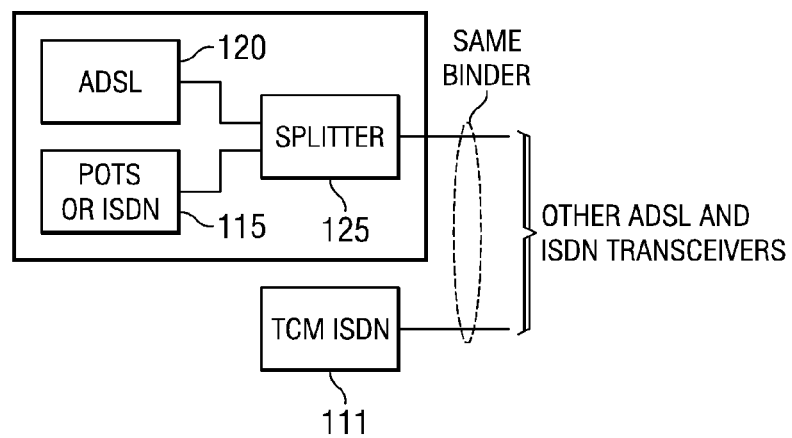
FIG. 1B is a block diagram illustrating a system for mitigating integrated services digital network interference in accordance with another exemplary embodiment of the present invention.

In another example, the negative impact on ADSL transmission due to NEXT interference from a TCM ISDN system 111, in which ADSL is independently deployed in the same binder, but on a different physical line, can also be advantageously mitigated (shown in FIG. 1B).

In both exemplary cases, interference is mitigated by performing bit loading operations in the ADSL transceiver 120 assuming a higher noise margin for subchannels that are likely to suffer from ISDN interference. The present invention can not only be applied to the two aforementioned types of interference, but can also be applied to interfering signals other than ISDN. It can be applied to mitigate the impact of off/on transitions of any interferer that is likely to cause a retrain in xDSL.

An aspect of the present invention operates to reduce the bit rates at which the system initializes responsive to expected non-constant noise. The reduction in bit rates can be effected by either (1) imposing an excess margin on some or all DMT tones or (2) adding a virtual noise signal (indicative of the excess margin) to the measured noise such that the total noise is of a similar level to the expected noise when the interfering sources become active. The excess margin or virtual noise can be imposed all the time, or the condition of the line can be monitored and the compensation turned off if it is detected that the interfering sources are present.

The potential sources of interference to a particular line can be determined in advance from knowledge of the deployment environment (for example, the modems are in Japan or Germany). The power spectral densities (PSDs) of expected disturbers (i.e., non-constant noise) can be determined either empirically or through simulation. Thus, an expected noise profile due to the expected disturbers can be estimated. During initialization, the actual line noise is estimated as a conventional part of modem training. In accordance with the present invention, the actual noise is then compared to the expected noise due to the disturbers, which may or may not have been active at the time the actual noise was estimated. If it is determined based on the actual noise that the expected disturbers are absent, then the present system "pre-compensates" for the disturbers, thus improving stability of the ensuing connection.

For example, in the case of same-pair ISDN, higher noise margins (corresponding to the expected noise profile) are imposed on the tones around 32, which are the tones most likely to be corrupted. Subsequently, bit loading is calculated using the adjusted noise margins. For example, if tone 28 is the lowest tone used for ADSL transmission, the noise margin on that tone can be adjusted to, say, 3 dB higher than the target noise margin (e.g., 6+3=9 dB) for bit loading. Tone 29 could then be loaded assuming a noise margin adjustment of, say, 2.5 dB, tone 30 assuming a noise margin adjustment of 2.0 dB, etc.

Figure 3:
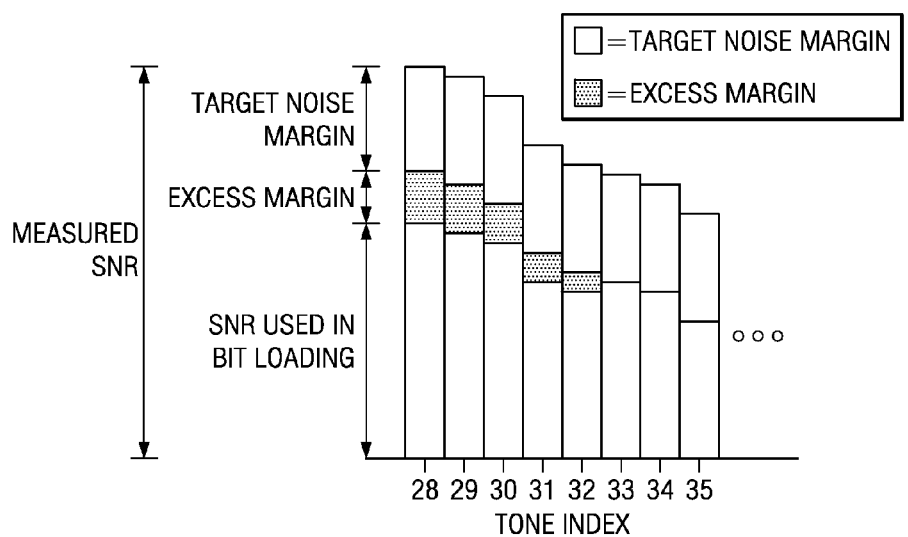
FIG. 3 is a graph illustrating adjusted noise margins in accordance with an exemplary embodiment of the present invention.

Referring now to FIG. 3 there is shown a graph illustrating adjusted noise margins in accordance with an exemplary embodiment of the present invention. Tone index is shown on the horizontal axis and SNR is shown on the vertical axis. Conventionally, bit loading for each tone is based on a final SNR, which is a measured SNR decreased by the target noise margin (e.g. 6 dB). According to the present invention, for those tones determined to be at risk of ISDN signal interference (tones around 32, in the case of same-pair ISDN), the final SNR is decreased further by an "excess margin" which can be selectively applied from tone to tone. Here it is shown that an excess margin is applied to selected tones and for each successively lower tone the excess margin is increased. The magnitude of the excess margins can be determined, for example, empirically based on simulation or measurements of post-splitter residual ISDN signals at the ADSL transceiver 120 (in the case of same-pair ISDN). Note that although tone 28 is the lowest tone shown used in FIG. 3, variability in the characteristics of an actual ISDN splitter low-pass filter can lead to the application of the present invention for a lowest tone index that is higher (or lower) than 28. Also, although not shown in FIG. 3, excess margins can also be applied to tones 33 and higher.

As the connection continues, the actual noise can be monitored to determine if the expected disturbers have become active, and the excess margin can be adjusted accordingly. That is, the actual noise can continue to be monitored and excess margin imposed or not based on the results. For example, assume that all expected disturbers become active and the difference between the expected noise and the measured noise becomes zero, then the excess margin is adjusted to zero. When the expected disturbers disappear (for example, an ISDN phone is hung up), the excess margins are re-imposed to ensure future stability. Because the excess margin is protection against interferers that are not yet present, the bit swapping procedure must be adjusted so the excess margins are not consumed by bits being swapped to the at-risk tones.

In practice, imposing the excess margin translates to:

Calculating a measured signal-to-noise ratio (SNR) on each tone using the measured ADSL channel and noise identifications, which are obtained when the ADSL transceivers 120 initialize to establish a connection, along with knowledge of the ADSL system (105, 111). In some embodiments, this calculation incorporates the gap from Shannon capacity and includes coding gain from forward error correction or other coding;

Estimating the difference between the measured noise and the expected noise that would be suffered if the expected ISDN disturber(s) were active. This gap becomes the excess margin to be imposed;

Decreasing the measured SNRs by the target noise margin (e.g. 6 dB);

Decreasing the measured SNRs for those tones determined to be at risk of ISDN signal interference by amounts corresponding to the estimated excess margin (either by imposing additional noise margins, or by adding to the measured noise a simulated noise signal representative of the expected noise that would be suffered if the ISDN disturber(s) were active); and Determining, via conventional bit loading techniques, how many bits to allocate to each subchannel based on the adjusted SNRs.

In at least one embodiment of the present invention, the excess margin can be effected by deliberately adding a virtual noise signal (indicative of the excess margin) to the actual noise measured during the initialization process. The added noise signal is selected to simulate the ISDN noise expected to appear at the ADSL receiver and results in a reduction in the calculated SNR. This is equivalent to increasing the noise margins on those tones and provides the desired conservative bit loading.

Figure 2:
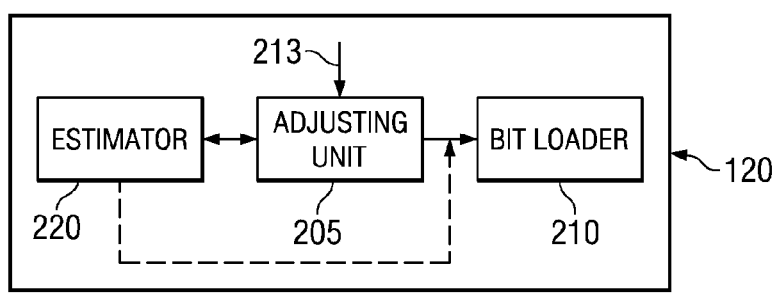
FIG. 2 is a block diagram of ADSL transceiver in accordance with exemplary embodiments of the present invention.

Referring now to FIG. 2 there is shown a block diagram of the ADSL transceiver 120 in accordance with exemplary embodiments of the present invention, including an estimator 220, bit loader 210 and adjusting unit 205. The estimator 220 is adapted to determine the SNR for each subchannel from measured channel noise (i.e. actual noise) during initialization and can be further adapted to continually monitor the actual noise on the communication link 30.

The adjusting unit 205 determines an excess margin via a comparison between the actual (measured or estimated) noise received from the estimator 220 and expected total noise (i.e., including ISDN interference) received as an indication at 213. The expected noise can be predetermined based on simulation information or actual measurements of post-splitter residual ISDN signals or TCM ISDN NEXT, for example. The excess margin is selected to be of sufficient magnitude to mitigate or prevent bit errors (or, equivalently, to prevent the noise margin from degrading to below desired level) when the expected ISDN interferers become active.

In one embodiment, the adjusting unit 205 determines an excess margin during initialization and applies this excess margin during the entire connection. Alternatively, the adjusting unit 205 can continually compare the expected noise to the actual noise and only apply this excess margin during periods when the actual noise is less than the expected noise.

In another embodiment, the adjusting unit 205 continually monitors the actual noise for determining a variable excess margin in which the excess margin is the difference between current actual noise and the expected noise.

Subsequently, the original SNR is decreased by the excess margin amount. As aforementioned, the excess margin is in addition to the target noise margin (which is typically 6 dB). The SNR is modified and prepared for bit loading by the bit loader 210. The bit loader 210 is adapted to allocate data bits, from the serial bit stream to be transmitted, to the subchannels in accordance with the respective modified SNRs. Known devices and/or routines can be used to allocate the bits once the adjusted signal to noise ratio is received.

Figure 4A:
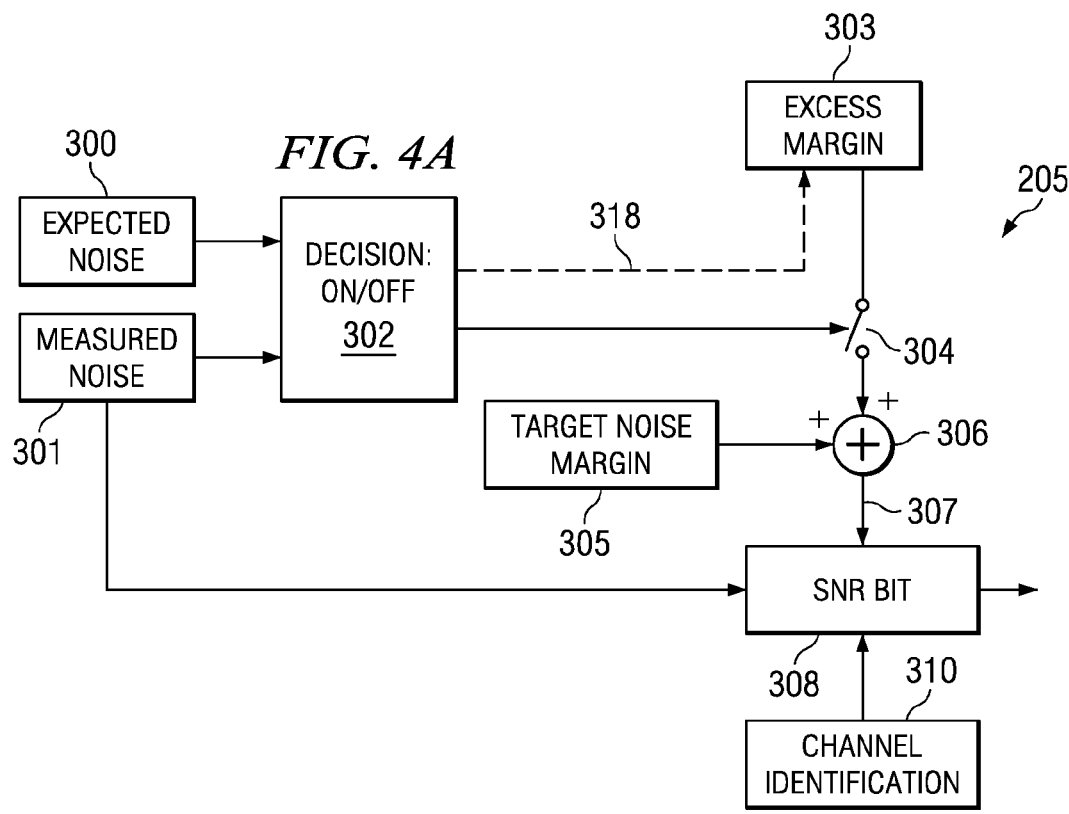
FIG. 4A illustrates an adjusting unit for use in the ADSL transceiver shown in FIG. 2 in accordance with an exemplary embodiment of the present invention.

Referring now to FIG. 4A there is illustrated a block diagram of an exemplary embodiment of the present invention. The expected noise received at input 213 is determined a priori, for example via simulation or empirically. It is the noise that is expected when the interferers are active (i.e., on). The measured noise 301 and channel identification 310 (from the estimator 220) are first computed during initialization and may be monitored and updated during the connection. The decision element 302 compares the measured noise 301 to the expected noise 300 and determines whether the interfering systems are active. If the decision element 302 determines the interfering systems are not active, the logical switch 304 is closed, and the excess margin 303, which typically varies with subchannel index (frequency), is added to the target noise margin 305 by the adding element 306. The target noise margin 305 is typically a fixed value for each subchannel, for example, 6 dB. The resulting margin 307 for each subchannel is then input along with the channel identification 310 and the measured noise 301 to the SNR and bit loading element 308, which computes the subchannel SNRs and determines how many bits to allocate to each subchannel.

If the decision element 302 compares the measured noise 301 to the expected noise 300 and determines that the interfering systems are active, then the logical switch 304 is left open. In this case, only the target noise margin 305 is input, along with the measured noise 301 and channel identification 310, to the SNR and bit loading element 308, which determines how many bits to allocate to each subchannel.

The decision element 302 can be selected to operate in several modes, including: 1) determining the required state of the logical switch 304 during initialization and not changing the state during the connection; 2) determining the required state of the logical switch 304 during initialization and then periodically or continually monitoring the measured noise 301 to determine what the state of the logical switch 304 should be based on a comparison of the measured noise 301 and expected noise 300.

The excess margin 303 can be determined at initialization as the difference between the expected noise 300 and the measured noise 301 and held constant for the duration of the connection, or it can be modified during the connection as the measured noise 301 changes, as shown generally by broken line 318 in FIG. 4A.

Figure 4B:
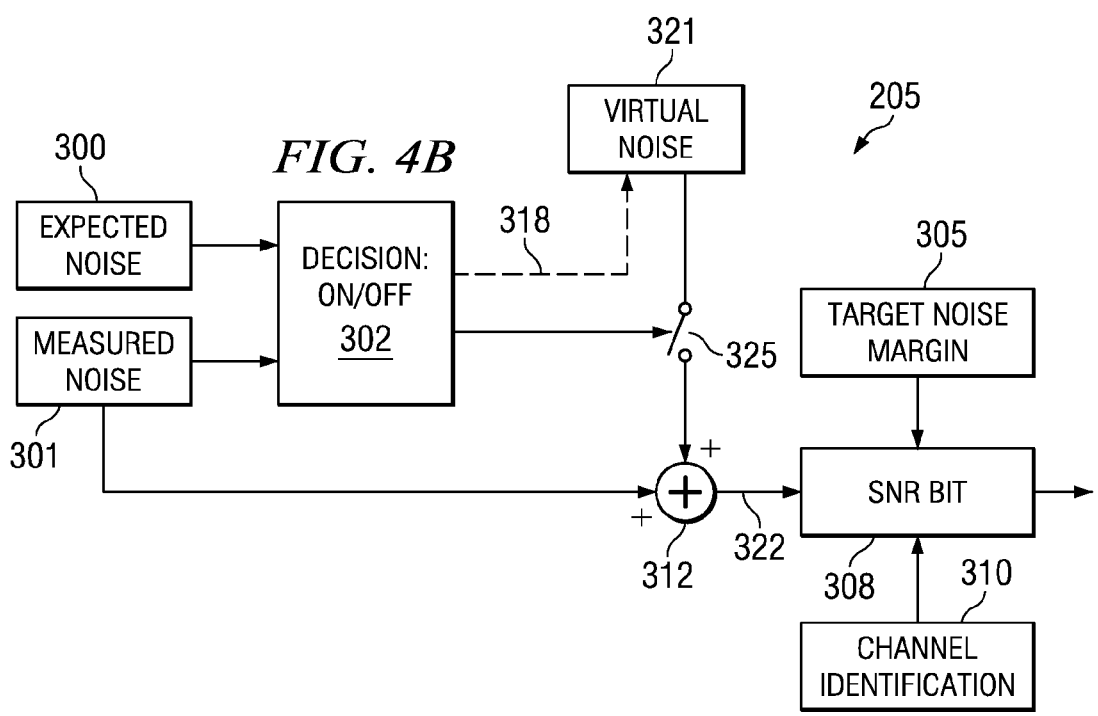
FIG. 4B illustrates an adjusting unit for use in the ADSL transceiver shown in FIG. 2 in accordance with an exemplary embodiment of the present invention.

Referring now to FIG. 4B, there is shown another exemplary embodiment of the present invention. The expected noise 300 is determined a priori, for example, via simulation or empirically. It is the expected noise when the interferers are active (i.e., on). The measured noise 301 and channel identification 310 (from the estimator 220) are first computed during initialization and may be monitored and updated during the connection. The decision element 302 compares the measured noise 301 to the expected noise 300 and determines whether the interfering systems are active. If the decision element 302 determines that the interfering systems are not active, the logical switch 325 is closed, and a virtual noise unit 321 applies an appropriate signal to be added to the measured noise signal 301 by the adding element 312. The resulting total noise 322 is then input, along with the target noise margin 305 (typically a fixed value for each subchannel, such as 6 dB) and channel identification 310, to the SNR and bit loading element 308, which computes the subchannel SNRs and determines how many bits to allocate to each subchannel.

If the decision element 302 determines that the interfering systems are active, the logical switch 325 is left open. In this case, the measured noise 301 is input to the SNR and bit loading element 308 along with the target noise margin 305 and the channel identification 310.

The decision element 302 can be selected to operate in several modes, including: 1) determining the required state of the logical switch 320 during initialization and not changing the state during the connection; 2) determining the required state of the logical switch 320 during initialization and then periodically or continually monitoring the measured noise 301 to determine what the state of the logical switch 320 should be based on a comparison of the measured noise 301 and expected noise 300.

The virtual noise 321 can be determined at initialization as the difference between the expected noise 300 and the measured noise 301 and held constant for the duration of the connection, or it can be modified during the connection as the measured noise 301 changes, as shown generally by the broken line 318 in FIG. 4B.

In contrast to the embodiment of FIG. 4A which reduces the SNR by increasing the noise margins used in the SNR calculation, in this case the adjusting margin is applied using a virtual noise signal which is added to the measured noise 301.

For DMT ADSL systems, the virtual noise can be added in the frequency domain on a tone-by-tone basis. Furthermore, the added virtual noise need not be Gaussian noise. It can simply be a zero-mean pseudo-random complex number sequence with constant amplitude. This minimizes the performance degradation due to the addition of a virtual noise signal to the system. For single-carrier applications, the virtual noise must be added in the time domain.

Figure 2A:
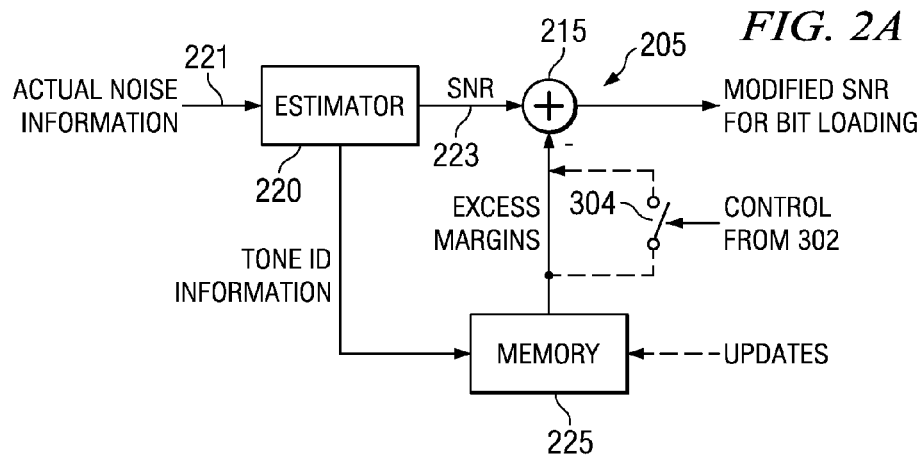
FIGS. 2A and 2B illustrate in more detail exemplary embodiments according to FIG. 2.
Figure 2B:
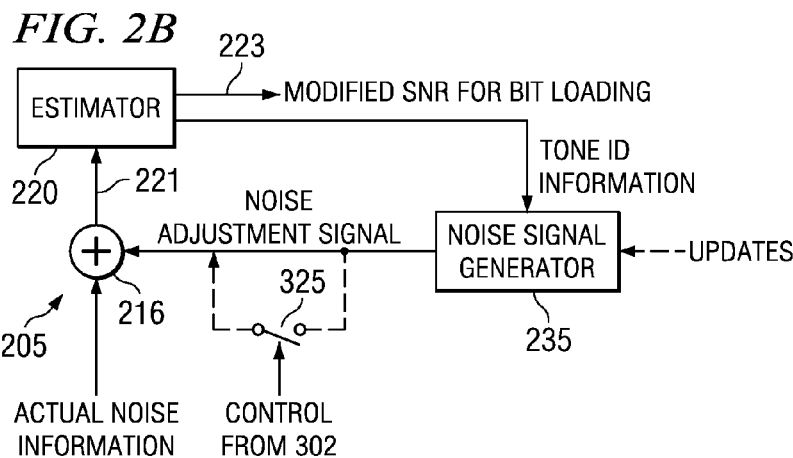

FIGS. 2A and 2B diagrammatically illustrate further exemplary embodiments according to the architecture of FIG. 2. In FIGS. 2A and 2B, the estimator 220 determines an SNR for each subchannel (accounting for the target noise margin of FIG. 3) in response to noise information for each subchannel, as received at 221. This operation of determining SNR from corresponding noise information, as performed by estimator 220, is well known in the art. In FIGS. 2A and 2B, the estimator 220 and adjusting unit 205 together form a subchannel quality indication unit for providing subchannel quality indicators (e.g., SNR values) to the bit loader 210.

In FIG. 2A, the noise information received at 221 is the conventionally available noise information which indicates the actual noise measured on the subchannels. The conventionally produced SNR values at 223 can then be reduced by corresponding excess SNR margins (see also FIG. 3) at 215, thereby to produce modified SNR values. These modified SNR values can then be provided to the bit loader 210 (see also FIG. 2), which can in turn use well known conventional techniques to effectuate an appropriate bit loading scheme corresponding to the SNR values received by the bit loader 210. The operation of the embodiments of FIG. 2A generally corresponds to the operation of the embodiments of FIG. 4A. As shown by broken line, the excess margin values of FIG. 2A can be selectively applied (or not) in the same general manner described above with respect to the decision logic 302 and switch 304 in FIG. 4A. Also as shown by broken line, the excess margin values can be updated into memory 225 during transceiver operation, in generally the same manner as described above with respect to FIG. 4A.

In FIG. 2B, the noise input 221 of estimator 220 is driven by the output of a noise adder 216, one of whose inputs is driven by the conventionally available noise information obtained from actual noise measurements on the subchannels. The other input of the noise adder 216 is driven by noise adjustment signals which correspond to various subchannels and which are produced by a noise signal generator 235. The noise adjustment signals of FIG. 2B generally correspond to the virtual noise described above with respect to FIG. 4B. Thus, each noise input seen at 221 by the estimator 220 accounts for the actual noise measured on that subchannel, and any noise adjustment signal added thereto at 216. Therefore, in FIG. 2B, SNR values produced at 223 by estimator 220 can include respective excess SNR margins which respectively correspond to the noise adjustment signals added at 216. The operation of the embodiments of FIG. 2B generally corresponds to the operation of the embodiments of FIG. 4B. As shown by broken line in FIG. 2B, the noise adjustment signals can be selectively added (or not) to the actual noise information, in generally the same manner described above with respect to decision logic 302 and switch 325 of FIG. 4B. Also as shown by broken line, the noise adjustment signals produced by the noise signal generator 235 of FIG. 2B can be updated during transceiver operation, in generally the same manner as described above with respect to FIG. 4B.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of supporting a digital communication on a plurality of frequency channels, comprising:
    allocating information bits to the frequency channels based on respectively corresponding channel quality indicators that include respective noise margins and Signal-to-Noise Ratio (SNR) values; and
    increasing the noise margin corresponding to at least one of a selected group of said frequency channels that are more susceptible to a predetermined type of interference than are the remaining frequency channels;
    arithmetically decreasing the at least one SNR value associated with said at least one frequency channel; and
    subtracting an excess noise margin SNR value from said at least one SNR value.

2. The method of claim 1, wherein said predetermined type of interference includes one of same-pair residual Integrated Service Digital Network (ISDN) signal interference and near-end crosstalk from Time-Compression Multiplexing ISDN signal interference.

3. The method of claim 1, wherein said increasing step includes increasing only the noise margins corresponding to the frequency channels of said group that are not experiencing said predetermined type of interference but are expected to during said digital communication.

4. The method of claim 3, including determining which frequency channels of said group are not experiencing said predetermined type of interference based on information indicative of actual interference conditions on said group of frequency channels.

5. The method of claim 4, including updating said actual interference information during said digital communication, and repeating said determining step during said digital communication based on said updated actual interference information.

6. The method of claim 1, including determining said excess noise margin Signal-to-Noise Ratio (SNR) value based on information indicative of an actual interference condition on said at least one frequency channel.

7. The method of claim 6, including updating said actual interference information during said digital communication, and repeating said determining step during said digital communication based on said updated actual interference information.

8. The method of claim 7, including determining during said digital communication which frequency channels of said group are not experiencing said predetermined type of interference based on said updated actual interference information, said increasing step including increasing only the noise margins corresponding to the frequency channels of said group that have been determined not to be experiencing said predetermined type of interference but are expected to during said digital communication.

9. A method of supporting a digital communication on a plurality of frequency channels, said method comprising:
    allocating information bits to the frequency channels based on respectively corresponding channel quality indicators that include respective noise margins and Signal-to-Noise Ratio (SNR) values;
    increasing the noise margin corresponding to at least one of a selected group of said frequency channels that are more susceptible to a predetermined type of interference than are the remaining frequency channels;
    for said at least one frequency channel, providing first information indicative of a first interference condition that is worse than an actual interference condition on said at least one frequency channels;
    providing second information indicative of said actual interference condition;
    adjusting said second information to produce said first information;
    combining said second information with third information indicative of a virtual noise signal to produce said first information; and
    producing said channel quality indicator for said at least one frequency channel in response to said first information.

10. The method of claim 9, wherein said increasing step includes performing said providing step only for those frequency channels of said group that are not experiencing said predetermined type of interference but are expected to during said digital communication, and further including producing said channel quality indicators for all other frequency channels of said group in response to corresponding actual interference conditions.

11. The method of claim 9, wherein said third information is a zero-mean pseudo-random complex number sequence with constant amplitude.

12. The method of claim 9, including determining said third information based on said second information.

13. The method of claim 12, including updating said second information during said digital communication, and repeating said determining step during said digital communication based on said updated second information.

14. The method of claim 13, including determining during said digital communication which frequency channels of said group are not experiencing said predetermined type of interference based on said updated second information, said increasing step including increasing only the noise margins corresponding to the frequency channels of said group that have been determined not to be experiencing said predetermined type of interference but are expected to during said digital communication.

15. The method of claim 9, wherein said channel quality indicators are SNR values, said increasing step including decreasing the SNR value corresponding to said at least one frequency channel.

16. An apparatus for supporting a digital communication on a plurality of frequency channels, comprising:
a bit loader for allocating information bits to the frequency channels based on respectively corresponding channel quality indicators that include respective noise margins and Signal-to-Noise (SNR) values; and
a channel quality indication unit coupled to said bit loader for providing said channel quality indicators thereto, said channel quality indication unit operable for increasing the noise margin corresponding to at least one of a selected group of said frequency channels that are more susceptible to a predetermined type of interference than are the remaining frequency channels, said channel quality unit further comprising an input for receiving information indicative of an actual interference condition on said at least one frequency channel, and logic coupled to said input for determining an excess noise margin SNR value based on said actual interference information and logic for decreasing the SNR value associated with said at least one frequency channel and for subtracting said excess noise margin SNR value from SNR value.

17. The apparatus of claim 16, wherein said predetermined type of interference includes one of same-pair residual Integrated Service Digital Network (ISDN) signal prying and near-end crosstalk from Time-Compression Multiplexing ISDN signal interference.

18. The apparatus of claim 16, wherein said channel quality indication unit includes an input for receiving information indicative of actual interference conditions on said group of frequency channels, and logic coupled to said input and responsive to said actual interference condition information for determining which frequency channels of said group are not experiencing said predetermined type of interference, and for increasing only the noise margins corresponding to the frequency channels of said group that have been determined not to be experiencing said predetermined type of interference but are expected to during said digital communication.

19. The apparatus of claim 18, wherein said input is further for receiving during said digital communication updated information indicative of updated actual interference conditions on said group of frequency channels, said logic responsive to said updated actual interference information during said digital communication for making an updated determination as to which frequency channels of said group are not experiencing said predetermined type of interference.

20. The apparatus of claim 16, wherein said input is further for receiving updated information indicative of an updated actual interference condition on said at least one frequency channel during said digital communication, said further logic for making an updated determination of said excess noise margin SNR value during said digital communication based on said updated actual interference information.

21. The apparatus of claim 16, wherein said channel quality indication unit includes an estimator having an input for receiving first information indicative of a first interference condition that is worse than an actual interference condition on said at least one frequency channel, said estimator for producing said channel quality indicator for said at least one frequency channel in response to said first information.

22. The apparatus of claim 21, wherein said channel quality indication unit includes an input for receiving information indicative of actual interference conditions on said group of frequency channels, and logic coupled to said input and responsive to said actual interference condition information for determining which frequency channels of said group are not experiencing said predetermined type of interference, and for increasing only the noise margins corresponding to the frequency channels of said group that have been determined not to be experiencing said predetermined type of interference but are expected to during said digital communication.

23. The apparatus of claim 21, wherein said channel quality indication unit includes an input for receiving second information indicative of said actual interference condition, and logic coupled to said last-mentioned input and said estimator input for adjusting said second information to produce said first information.

24. The apparatus of claim 23, wherein said channel quality indicator is an SNR value and said logic includes a combiner for combining said second information with third information indicative of a virtual noise signal to produce said first information.

25. The apparatus of claim 23, wherein said logic includes a combiner for combining said second information with third interference information to produce said first information.

26. The apparatus of claim 25, wherein said third interference information is a zero-mean pseudo-random complex number sequence with constant amplitude.

27. The apparatus of claim 25, wherein said channel quality indication unit includes further logic coupled to said last-mentioned input for determining said third information based on said second information.

28. The apparatus of claim 27, wherein said last-mentioned input is further for receiving during said digital communication an update of said second information, said further logic responsive to said updated second information during said digital communication for making an updated determination of said third information.

29. A digital communication apparatus, comprising:
a transmitter for performing digital communication on a plurality of frequency channels, including a bit loader for allocating information bits to the frequency channels based on respectively corresponding channel quality indicators that include respective noise margins and Signal-to-Noise (SNR) values; and
a channel quality indication unit coupled to said bit loader for providing said channel quality indicators thereto, said channel quality indication unit operable for increasing the noise margin corresponding to at least one of a selected group of said frequency channels that are more susceptible to a predetermined type of interference than are the remaining frequency channels; said channel quality indication unit comprising:

an estimator having a first input for receiving first information indicative of a first interference condition that is worse than an actual interference condition on said at least one frequency channel, said estimator for producing said channel quality indicator for said at least one frequency channel in response to said first information;

a second input for receiving second information indicative of said actual interference condition, and logic coupled to said second input and said estimator input for adjusting said second information to produce said first information; and combiner for combining said second information with third information indicative of a virtual noise signal to produce said first information.

30. The apparatus of claim 29, provided as an Asymmetric Digital Subscriber Line (ADSL) apparatus.

* * * * *